(No Model.)
W. A. WRIGHT.
GRADUATED BALL AND SOCKET JOINT FOR SURVEYORS' INSTRUMENTS.
No. 343,558. Patented June 8, 1886.
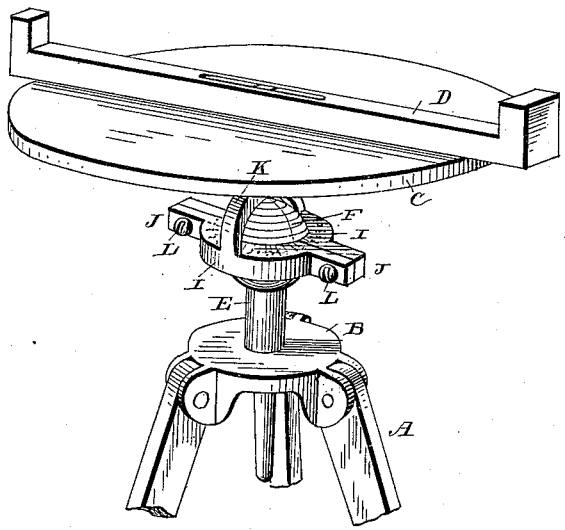
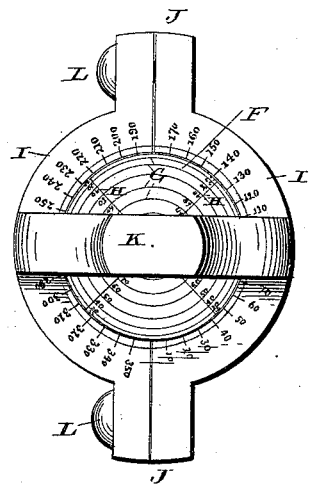
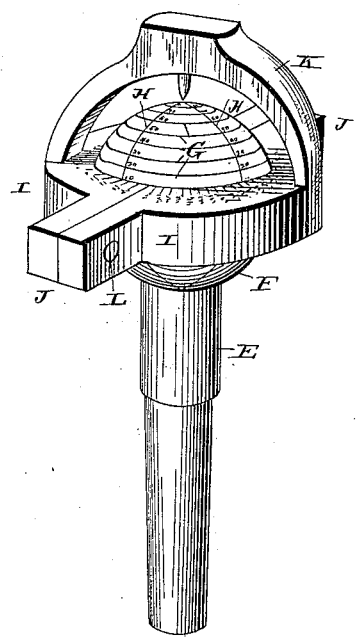
WITNESSES
F. L. Durand
A. L. Morsell
INVENTOR
W. Abram Wright
by Louis Bagger & Co.
his Attorney s.

UNITED STATES PATENT OFFICE.

W. ABRAM WRIGHT, OF CHIPLEY, GEORGIA, ASSIGNOR OF ONE-HALF TO JOHN W. LAPSLEY, OF SHELBY COUNTY, ALABAMA, AND JOHN B. LAPSLEY, OF FLOYD COUNTY, GEORGIA.

GRADUATED BALL-AND-SOCKET JOINT FOR SURVEYORS' INSTRUMENTS.

SPECIFICATION forming part of Letters Patent No. 343,558, dated June 8, 1886.

Application filed December 16, 1885. Serial No. 185,867. (No model.)

*To all whom it may concern:*

Be it known that I, W. ABRAM WRIGHT, a citizen of the United States, and a resident of Chipley, in the county of Harris and State of Georgia, have invented certain new and useful Improvements in Tripod-Joints; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of a leveling-instrument provided with my improved tripod-joint. Fig. 2 is a perspective view on an enlarged scale of the joint, and Fig. 3 is a top view of the same.

Similar letters of reference indicate corresponding parts in all the figures.

My invention has relation to joints for the tripods or supports for leveling-instruments or other instruments in which an accurate adjustment of level is desired; and it consists in the improved construction and combination of parts of a ball-and-socket joint in which the ball and socket are marked and graduated so that the angle formed by the surface upon which the tripod is placed and the horizontal plane may be read upon the joint, enabling the operator to make notes of the several angles at which the joint is placed during a line of observations, enabling him to adjust the tripod immediately at the correct position if another observation has to be taken at the spot where one observation has been taken, as well as enabling the operator to read elevations and depressions upon the joint by first leveling the sights of the instrument and thereupon elevating the sight-bar or depressing it, as desired, the angles being read upon the joint, as hereinafter more fully described and claimed.

In the accompanying drawings, the letter A indicates the tripod, which is formed with the plate or table B, and C indicates the plate which forms the artificial horizon and upon which the sight-bar D is pivoted. A shank, E, is inserted into a perforation in the tripod-table, and the upper end of this shank is formed with a ball, F, which is graduated with a number of parallel circles, G, and a number of circles, H, intersecting the parallel circles at right angles, four of these circles being shown in the drawings, and the intersecting points of the two sets of circles are marked to indicate the number of degrees which the parallel circles mark from the upper end of the axis of the sphere to the middle of the same. A socket is formed by two semicircular arms, I, having their ends bent outward to form perforated ears J, and connected by means of a yoke, K, secured at its ends to the semicircular arms at their middles and at its upper portion to the plate forming the artificial horizon. Screws pass through and secure together the perforated ears, and these screws L L may be loosened so as to allow the semicircular arms to slide freely upon the surface of the ball, while by tightening the screws the socket formed by the semicircular arms may be clamped firmly upon the ball. The upper sides of the semicircular arms are graduated at their inner edges, so that by turning the socket upon the ball the angles between the different positions of one of the circles intersecting the parallel circles upon the ball may be read upon the graduated edge of the annular socket formed by the semicircular arms. In this manner the relative positions of the two portions of the joint, and consequently of the instrument, may be ascertained by reading upon the ball and upon the annular socket, and the two parts of the joint may be secured in any position in which they might be adjusted.

It follows that this joint may be used in leveling-instruments, astronomic instruments, or any other instruments in which accuracy of adjustment is desired, together with a facility for locating the relative positions of the two parts of the joint in different adjustments.

Having thus described my invention, I claim and desire to secure by Letters Patent of the United States—

In a ball-and-socket joint, the combination of a ball having a shank and having a number of parallel equidistant circles, and a number of circles intersecting the parallel circles at right angles and intersecting each other at the same points, with a socket formed by two semicircular arms having their inner edges graduated and having their middles connected by a yoke and their ends formed into perforated ears having screws uniting them, as and for the purpose shown and set forth.

In testimony that I claim the foregoing as my own I have hereunto affixed my signature in presence of two witnesses.

W. ABRAM WRIGHT.

Witnesses:
W. P. HAYNES,
A. B. CONOVER, Jr.